(12) United States Patent
Heinecke et al.

(10) Patent No.: US 12,162,480 B2
(45) Date of Patent: Dec. 10, 2024

(54) METHODS AND APPARATUS TO MITIGATE HARD-BRAKING EVENTS

(71) Applicant: Intel Corporation, Santa Clara, CA (US)

(72) Inventors: Alexander Heinecke, San Jose, CA (US); Sara Baghsorkhi, Los Gatos, CA (US); Justin Gottschlich, Santa Clara, CA (US); Mohammad Mejbah Ul Alam, Milpitas, CA (US); Shengtian Zhou, Palo Alto, CA (US); Jeffrey Ota, Morgan Hill, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/104,923

(22) Filed: Feb. 2, 2023

(65) Prior Publication Data

US 2023/0256961 A1    Aug. 17, 2023

Related U.S. Application Data

(63) Continuation of application No. 16/370,855, filed on Mar. 29, 2019, now Pat. No. 11,590,968.
(Continued)

(51) Int. Cl.
*B60W 30/09*    (2012.01)
*B60T 8/1755*    (2006.01)
(Continued)

(52) U.S. Cl.
CPC ......... *B60W 30/09* (2013.01); *B60T 8/17555* (2013.01); *B60T 8/17558* (2013.01);
(Continued)

(58) Field of Classification Search
CPC ...... B60W 30/09; B60W 10/18; B60W 10/20; B60W 30/0956; B60W 50/0098;
(Continued)

(56) References Cited

U.S. PATENT DOCUMENTS

| | | |
|---|---|---|
| 6,037,860 A | 3/2000 | Zander |
| 6,405,132 B1 | 6/2002 | Breed |

(Continued)

FOREIGN PATENT DOCUMENTS

| | | | | |
|---|---|---|---|---|
| CN | 109591811 A | 4/2019 | | |
| DE | 102015224171 A1 * | 6/2017 | ............. | B60Q 9/008 |

(Continued)

OTHER PUBLICATIONS

DE-102015224171-A1 translation (Year: 2017).*
(Continued)

*Primary Examiner* — Kyle T Johnson
(74) *Attorney, Agent, or Firm* — Hanley, Flight & Zimmerman, LLC

(57) ABSTRACT

Methods, apparatus, systems, and articles of manufacture are disclosed herein that mitigate hard-braking events. An example apparatus at least one memory; instructions; and processor circuitry to execute the instructions to: determine a danger level associated with an object, the danger level indicative of a first measure of damage corresponding to a trajectory of the object compared to a trajectory of a vehicle; determine, based on the first danger level, a danger measure based on at least one of a position of the object, a velocity of the object, an acceleration of the object, a direction of travel of the object, a weight or mass of the object; and generate instructions to transmit to a steering system or a braking system of the vehicle based on the determination.

20 Claims, 4 Drawing Sheets

Related U.S. Application Data

(60) Provisional application No. 62/753,877, filed on Oct. 31, 2018.

(51) Int. Cl.
  *B60W 10/18* (2012.01)
  *B60W 10/20* (2006.01)
  *B60W 30/095* (2012.01)
  *B60W 50/00* (2006.01)
  *G06N 20/00* (2019.01)

(52) U.S. Cl.
  CPC ............ *B60W 10/18* (2013.01); *B60W 10/20* (2013.01); *B60W 30/0956* (2013.01); *B60W 50/0098* (2013.01); *G06N 20/00* (2019.01); *B60T 2210/32* (2013.01); *B60T 2260/02* (2013.01); *B60T 2270/86* (2013.01)

(58) Field of Classification Search
  CPC ............ B60T 8/17555; B60T 8/17558; B60T 2210/32; B60T 2260/02; B60T 2270/86; G06N 20/00; G06N 3/08
  See application file for complete search history.

(56) References Cited

U.S. PATENT DOCUMENTS

| | | |
|---|---|---|
| 6,526,352 B1 | 2/2003 | Breed |
| 7,124,027 B1 | 10/2006 | Ernst, Jr. |
| 8,520,695 B1 | 8/2013 | Rubin |
| 9,886,841 B1* | 2/2018 | Nave .................... G06V 20/56 |
| 9,950,708 B1 | 4/2018 | Cullinane |
| 11,590,968 B2* | 2/2023 | Heinecke ............. B60W 30/09 |
| 2004/0122578 A1 | 6/2004 | Isaji |
| 2006/0109094 A1* | 5/2006 | Prakah-Asante ...... B60Q 9/008 340/439 |
| 2007/0288133 A1* | 12/2007 | Nishira ................ G05D 1/0246 701/23 |
| 2008/0097699 A1* | 4/2008 | Ono ................... B62D 15/0265 701/300 |
| 2008/0249687 A1 | 10/2008 | Le |
| 2009/0076702 A1 | 3/2009 | Arbitmann |
| 2011/0246156 A1 | 10/2011 | Zecha |
| 2013/0253793 A1 | 9/2013 | Lee |
| 2013/0296134 A1 | 11/2013 | Petzold |
| 2014/0067206 A1* | 3/2014 | Pflug ........................ B60T 7/22 701/41 |
| 2014/0240115 A1 | 8/2014 | Igarashi |
| 2015/0151725 A1 | 6/2015 | Clarke |
| 2015/0160653 A1* | 6/2015 | Cheatham, III ...... G05D 1/0088 701/23 |
| 2015/0203112 A1 | 7/2015 | Duncan |
| 2017/0162055 A1 | 6/2017 | Lehner |
| 2018/0043793 A1 | 2/2018 | Herb |
| 2018/0297591 A1* | 10/2018 | Minemura ............ B60W 40/00 |
| 2019/0011910 A1* | 1/2019 | Lockwood ........... G05D 1/0038 |
| 2019/0126911 A1 | 5/2019 | Nienhueser |
| 2019/0210595 A1* | 7/2019 | Cheaz ................... B60W 40/06 |
| 2019/0225213 A1* | 7/2019 | Heinecke .......... B60W 30/0956 |
| 2020/0079396 A1 | 3/2020 | Beaurepaire |
| 2020/0110414 A1* | 4/2020 | Dupre ................ G01C 21/3658 |
| 2020/0133288 A1 | 4/2020 | Abari |
| 2020/0159214 A1 | 5/2020 | Misu |
| 2020/0361483 A1* | 11/2020 | Yonushonis ...... B60W 30/0956 |
| 2021/0276588 A1* | 9/2021 | Kabzan ................ B60W 10/20 |
| 2022/0097732 A1* | 3/2022 | Cunningham ........ B60W 30/09 |
| 2023/0256961 A1* | 8/2023 | Heinecke ........... B60T 8/17555 701/70 |

FOREIGN PATENT DOCUMENTS

| | | | |
|---|---|---|---|
| DE | 102017223364 A1 * | 7/2018 | ............. B60T 13/66 |
| FR | 2934216 A1 | 1/2010 | |
| JP | 2004098726 A | 4/2004 | |
| WO | 2010119860 A1 | 10/2010 | |
| WO | 2017016716 A1 | 2/2017 | |

OTHER PUBLICATIONS

DE-102017223364-A1 translation (Year: 2018).*
Deng et al, "Driving Style Recognition Method Using Braking Characteristics Based on Hidden Markov Model" (Year: 2017).
United States Patent and Trademark Office, "Non-Final Action" issued in U.S. Appl. No. 16/370,855 on Feb. 11, 2021 (22 pages).
United States Patent and Trademark Office, "Final Action" issued in U.S. Appl. No. 16/370,855 on Jul. 9, 2021 (33 pages).
United States Patent and Trademark Office, "Non-Final Action" issued in U.S. Appl. No. 16/370,855 on Nov. 15, 2021 (37 pages).
United States Patent and Trademark Office, "Final Action" issued in U.S. Appl. No. 16/370,855 on May 2, 2022 (38 pages).
United States Patent and Trademark Office, "Notice of Allowance" issued in U.S. Appl. No. 16/370,855 on Oct. 20, 2022 (10 pages).

* cited by examiner

METHODS AND APPARATUS TO MITIGATE HARD-BRAKING EVENTS

RELATED APPLICATION

This patent arises from a continuation of U.S. patent application Ser. No. 16/370,855, (now U.S. patent Ser. No. 11,590,968) which was filed on filed on Mar. 29, 2019, which claims the benefit of U.S. Provisional Patent Application Ser. No. 62/753,877, which was filed on Oct. 31, 2018. U.S. patent application Ser. No. 16/370,855 and U.S. Patent Application Ser. No. 62/753,877 are hereby incorporated by reference in their entirety. Priority to U.S. patent application Ser. No. 16/370,855 and U.S. Patent Application Ser. No. 62/753,877 is hereby claimed.

FIELD OF THE DISCLOSURE

This disclosure relates generally to autonomous vehicles and, more particularly, to methods and apparatus to mitigate hard-braking events.

BACKGROUND

Autonomous vehicles are inevitably presented with situations in which sudden braking events are initiated to avoid collisions. For example, vehicles driving on a road or other driving surface may suddenly encounter an object that moves into the path of the vehicle (e.g., another vehicle, an animal, a person, etc.). In such examples, the autonomous vehicle reacts (e.g., by braking) to avoid damage to the vehicle and/or risk to the driver and/or other passengers.

DETAILED DESCRIPTION

Vehicles with autonomous anti-collision systems react to emergency situations when an obstacle (e.g. a person, a deer, another vehicle, etc.) suddenly appears in the path of the vehicle. Known anti-collision systems typically use radar as the main source of sensor input to detect the unexpected obstacle. Such known anti-collision systems employing radar only allow the vehicle to see a simple model of its surroundings as compared to a richer (e.g., more detailed) model captured by other/additional sensing devices (e.g. cameras, lidars, radar, supersonic sensors, etc.). With insufficient information about the actual surroundings (e.g. nearby cars, people, animals, buildings, rocks, weather, etc.), an autonomous vehicle using a known commercial anti-collision system is likely to initiate a hard-brake as a response to an unexpected appearance of an obstacle. Although such practice is acceptable in some examples, such as stopping small cars, comfortability is sacrificed. In examples in which the vehicle is large (e.g., an airport shuttle), a hard-brake response to a hard-brake situation may even cause unwanted injuries, such as, for example, injuries to passengers who are not buckled up, cargo, etc. As used herein, a hard-brake situation is a situation requiring hard-braking in which a human driver is about to be hit or is being hit by one or multiple obstacle(s) due to slow reaction (e.g., of a driver, of an autonomous vehicle anti-collision system, etc.) or vehicle system issue(s).

Examples disclosed herein utilize a rich model system (e.g., a world generation model using cameras, lidar, radar, supersonic sensors, etc.) for the vehicle to analyze the surroundings (e.g., substantially constantly) to accurately predict and, potentially, avoid a hard-brake situation (e.g., to utilize hard-braking as a last resort).

Known methods include equipping a vehicle with anti-collision systems which will hard-brake in case of an emergency and/or use known automatic vehicle cruise control systems to keep a safe distance from other vehicles ahead of the vehicle. As discussed above, anti-collision systems can lead to loss of comfortability and/or injury to passengers and/or cargo. Further, known methods that use automatic cruise control to maintain a safe distance behind other vehicles cannot react to instances where an unanticipated object enters the driving path of the vehicle. Therefore, an anti-collision system having the ability to avoid unanticipated obstacles while mitigating the use of hard-braking, as well as maintaining driver and/or passenger comfortability, is desired.

Figure 1:
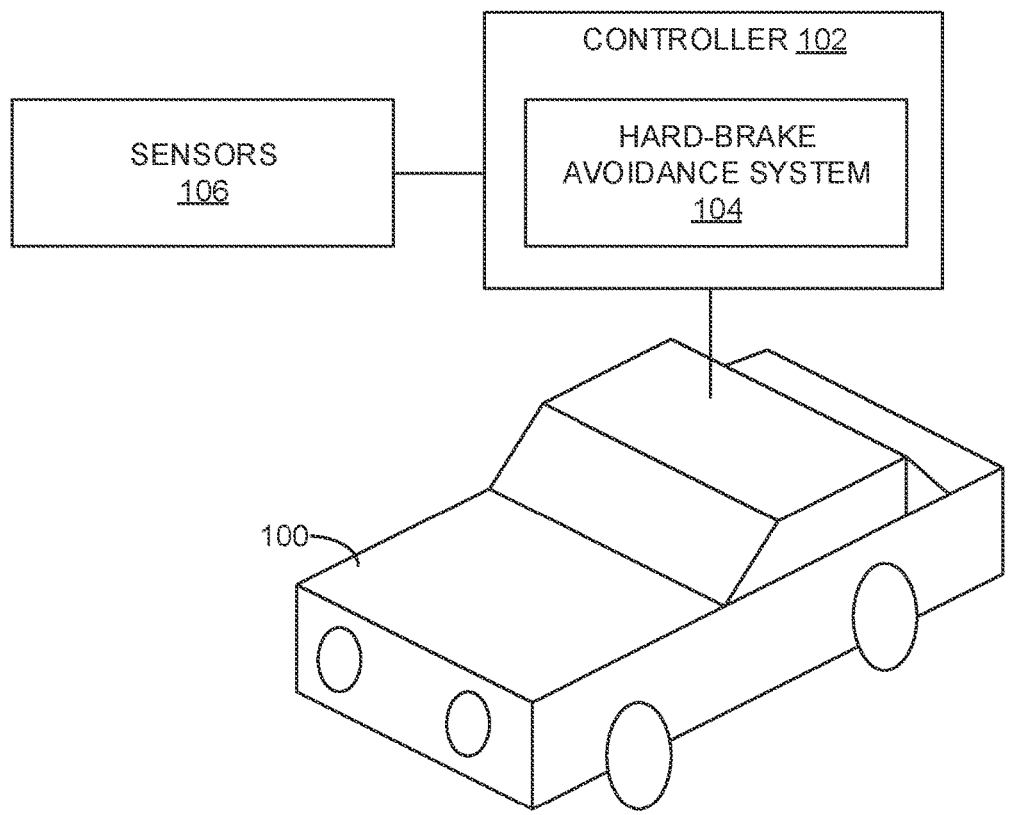
FIG. 1 is a schematic illustration of an example vehicle including an example controller.

FIG. 1 is a schematic illustration of an example vehicle 100 including an example controller 102. The vehicle 100 of the illustrated example is an autonomous vehicle. In some examples, the vehicle 100 is fully autonomous. Additionally or alternatively, the vehicle 100 may be a semi-autonomous vehicle. For example, the vehicle 100 may assist a driver of the vehicle 100 in maintaining speed, changing lanes, accelerating or decelerating, braking, etc., while the driver maintains ultimate control of the vehicle 100.

The controller 102 of the illustrated example implements an example hard-brake avoidance system 104. In some examples, the controller 102 facilitates communications between the hard-brake avoidance system 104 and other systems of the vehicle 100. For example, the controller 102 facilitates communication between the hard-brake avoidance system 104 and example sensors 106. In some examples, the controller 102 facilitates communications between the hard-brake avoidance system 104 and a braking system of the vehicle 100, an engine control module of the vehicle 100, a steering system of the vehicle 100, and/or other systems of the vehicle 100.

The hard-brake avoidance system 104 of the illustrated example is communicatively coupled to a braking system of the vehicle 100 and a steering system of the vehicle 100 via the controller 102. In some examples, the hard-brake avoidance system 104 is communicatively coupled (e.g., via the controller 102) to additional systems of the vehicle, such as an engine control module, a powertrain, a suspension system, etc. In the illustrated example, the hard-brake avoidance system 104 is further communicatively coupled (e.g., via the controller 102) to the sensors 106 to receive information regarding surroundings of the vehicle 100. For example, the sensors 106 may include cameras, lidar, radar, supersonic sensors, etc. In some examples, the sensors 106 further monitor systems of the vehicle 100 (e.g., braking system, steering system, powertrain, etc.).

The hard-brake avoidance system 104 of the illustrated example is a predictor for hard-brake situations that mitigates hard-braking through adaptive steering (e.g., turning the vehicle 100 to avoid a collision). By using a rich model world perceived by the sensors 106 (e.g., radar, lidar, cameras, etc.), the vehicle 100 can clearly classify movable (e.g., another vehicle on the road) and stationary objects (e.g., a fallen branch in the road). With a clear classification of the nearby objects (e.g. a falling rock) and an understanding of their physical information (e.g. height, size, speed, acceleration), the vehicle 100 can evaluate a danger level for each detected object based on its own speed and position. Instead of only reacting with hard-braking when it is definite that an obstacle is in the trajectory of the vehicle 100, the hard-brake avoidance system 104 predicts when a hard-brake situation is likely to occur and further uses adaptive steering and/or other means to avoid a hard-braking scenario.

Figure 2:
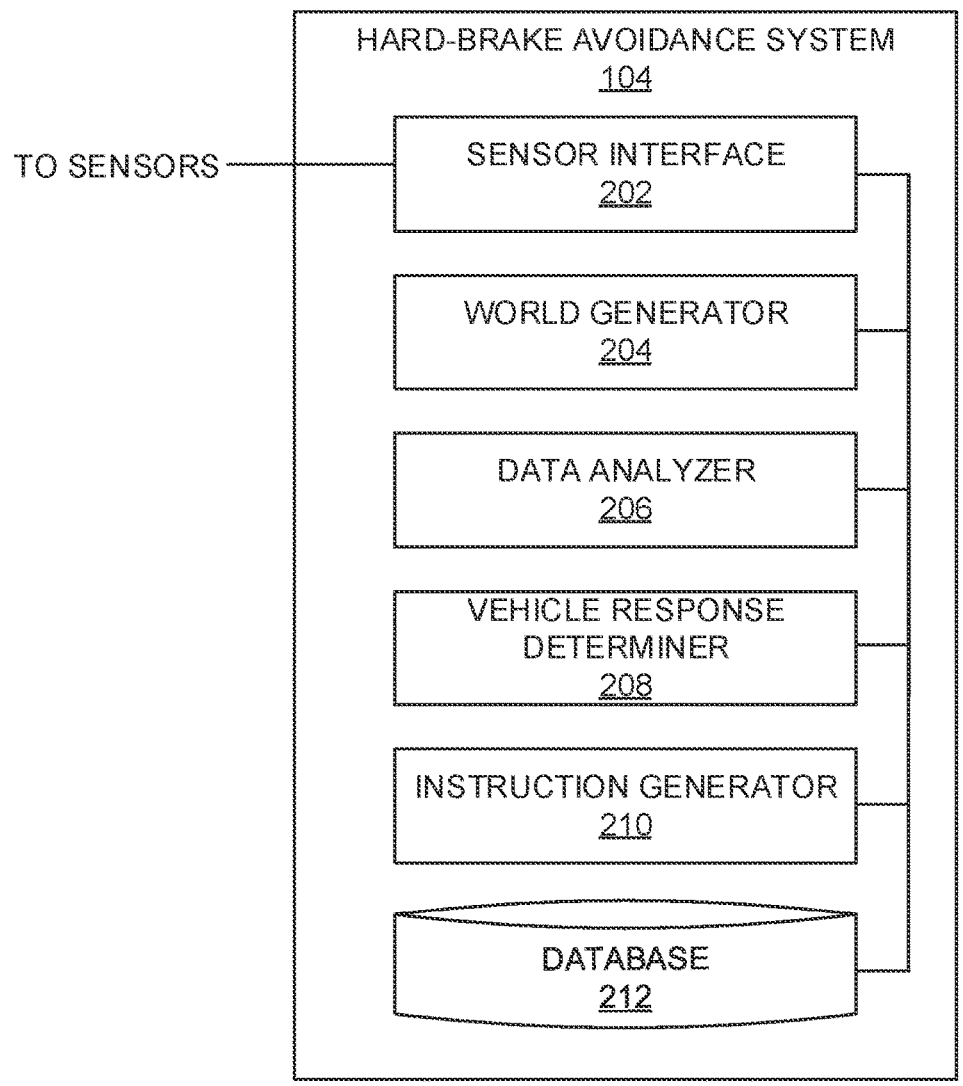
FIG. 2 is a block diagram of an example implementation of the hard-brake avoidance system of FIG. 1.

FIG. 2 is a block diagram of an example implementation of the hard-brake avoidance system 104 of FIG. 1. In the illustrated example, the hard-brake avoidance system 104 includes an example sensor interface 202, an example world generator 204, an example data analyzer 206, an example vehicle response determiner 208, an example instruction generator 210, and an example database 212. The hard-brake avoidance system 104 of the illustrated example is further communicatively coupled to the example sensors 106 of FIG. 1.

In the illustrated example, the sensor interface 202 receives information from the sensors 106. For example, the sensor interface 202 may receive sensor information from radar, lidar, cameras, supersonic sensors, point-to-point (PtP) communications, and/or other sensors. In some examples, the sensor interface 202 transmits the sensor data to the database 212 to be stored. In some examples, the database 212 is further communicatively coupled to the world generator 204, the data analyzer 206, the vehicle response determiner 208, and/or the instruction generator 210. The sensor interface 202 further transmits the sensor information to the world generator 204 for generation of the rich model world (e.g., a detailed model of the surroundings of the vehicle 100). Additionally or alternatively, the world generator 204 accesses the sensor information from the database 212. The world generator 204 further tracks potential obstacles (e.g., movable objects or stationary objects) around the vehicle 100 and classifies the objects as movable or stationary. This tracking is performed, for example, by using information received from the sensors 106 (e.g., the cameras, radar, lidar, PtP communication, etc.).

Through appropriate models (e.g., deep learning models) and/or Newton's laws of motion, the example world generator 204 determines the trajectories of any moving objects. Such a model, and the application of Newton's laws, enables the example world generator 204 to develop a view into the subsequent movement of the objects in the proximity of the vehicle 100. For example, using Newton's mechanics, the world generator 204 is able to figure out how an obstacle is moving (e.g., position of the object, acceleration and velocity of the object, etc.), which may lead to a significantly longer braking distance than other vehicles employing known anti-collision systems.

In some examples, the data analyzer 206 of the hard-brake avoidance system 104 can predict the danger level (e.g., by assigning a danger level of either 0 or 1) for each movable object (e.g. a standing person, a moving vehicle, a falling rock, etc.). For example, a danger level of 1 may indicate a hard-brake situation and a danger level of 0 may indicate that no harm will come from the object. In some examples, the data analyzer 206 predicts the danger level on a scale of 1 to 10. For example, the data analyzer 206 may predict that an object presenting low risk to the vehicle 100 (e.g., a rock or other stationary object on a shoulder of the road) has a danger level of 1, while an object presenting a high risk to the vehicle 100 (e.g., another vehicle cutting into the same lane as the vehicle 100) has a much higher danger level (e.g., a danger level of 9 or 10). In some examples, the data analyzer 206 determines the danger level of the object based on one or more characteristics of the object and/or the vehicle. For example, the data analyzer 206 may determine the danger level based on a position of the object, a velocity of the object, an acceleration of the object, a direction of travel of the object, a weight or mass of the object, a size of the object (e.g., length, width, height, circumference, etc.), a distance between the object and the vehicle 100, a trajectory of the object compared to a trajectory of the vehicle 100, and/or any other physical characteristic of the object and/or the vehicle 100.

Further, the vehicle response determiner 208 of the illustrated example may analyze whether the hard-brake situation is avoidable (e.g. if a turn to either side of the vehicle 100 is open and clear) and determine that the hard-brake situation may be avoided through adaptive steering. For example, when the data analyzer 206 determines that the danger level meets a threshold (e.g., has a value of 1 when the data analyzer 206 assigns a danger level of either 0 or 1), the vehicle response determiner 208 analyzes the surroundings (e.g., objects in proximity of the vehicle 100) determined by the world generator 204. In such an example, the vehicle response determiner 208 may determine that the vehicle 100 may avoid the object without hard-braking by steering around the object. For example, in a situation where the vehicle 100 is traveling on a four-lane highway, the vehicle response determiner 208 may determine that the vehicle 100 is to change lanes (e.g., from the right lane to the left lane) to avoid an object because other vehicles are not driving in the other lane (e.g., the left lane). In such an example, the hard-braking is avoided while preventing a collision with the object.

The vehicle response determiner 208 further determines whether the vehicle 100 is safe to break rules and laws to avoid a collision or hard braking. For example, the vehicle response determiner 208 may determine whether the vehicle 100 is safe to use oncoming lanes (e.g., a lane of oncoming traffic on a two-lane highway). In some such examples, the vehicle response determiner 208 may determine that the vehicle 100 can safely use the oncoming lane because there are no other vehicles (e.g., oncoming traffic) detected by the sensors 106.

In some examples, the vehicle response determiner 208 determines that the vehicle 100 is to hard-brake to avoid a collision. For example, when the data analyzer 206 determines that the level of danger is high (e.g., a danger level of 10 on a scale of 1-10), the vehicle response determiner 208 may determine that hard-braking enables the vehicle 100 to avoid the collision. In some such examples, the vehicle response determiner 208 determines that an adaptive steering maneuver will not successfully avoid the collision and that hard-braking will avoid the collision. Thus, the example vehicle response determiner 208 determines that the proper response to avoid the collision is for the vehicle 100 to hard-brake. In some examples, the vehicle response determiner 208 determines that, in response to an object that may cause a collision, the vehicle 100 is to initiate an adaptive steering maneuver and apply the vehicle brakes in combination. For example, the vehicle response determiner 208 may determine that the vehicle 100 is to steer onto the shoulder of a road and apply the brakes to stop the vehicle 100. In such an example, the steering system of the vehicle 100 may apply a braking force that is less than the braking force of hard-braking, thus maintaining comfortability of the driver and/or passengers of the vehicle 100 while preventing the collision.

In some examples, the data analyzer 206 further analyzes an amount of damage that is likely to occur to the vehicle 100 and/or another vehicle or object when an adaptive steering maneuver and/or hard-braking is initiated. For example, when the vehicle 100 is in danger of colliding with another vehicle, the data analyzer 206 may determine that the collision cannot be avoided and assesses a danger level of 10 (e.g., on a scale of 1-10). In such an example, the data analyzer 206 may use data generated by the world generator 204 regarding the characteristics of the object and the movement of the object (e.g., acceleration, velocity, size, distance from the vehicle 100, etc.), as well as data of the vehicle 100 (e.g., speed, weight, etc.) to determine the damage associated with possible responses. For example, the data analyzer 206 may calculate the damage of an adaptive steering maneuver, braking, hard-braking, and/or a combination of responses based on the known information regarding the object and the vehicle 100.

In some examples, the data analyzer 206 uses Newton's laws to calculate the speed, acceleration, and/or other characteristics of the objects at a point of impact. These calculations may further be used, for example, to calculate a force or pressure at impact, which may indicate an amount of damage to the vehicle 100 and/or the object. When the example data analyzer 206 determines an amount of damage associated with one or more vehicle responses, the vehicle response determiner 208 determines a response of the vehicle 100 based on the amount of damage that will be caused. For example, the vehicle response determiner 208 can determine that the vehicle response that causes the least amount of damage is to be initiated by the vehicle 100.

In some examples, the data analyzer 206 further determines that the vehicle 100 includes a driver but does not include a passenger in the passenger seat or in the back seat(s). In such an example, the vehicle response determiner 208 may use this information to determine that the vehicle 100 is to initiate a steering maneuver that causes any impact (e.g., if impact cannot be avoided) to occur on the passenger's side (e.g., by turning to expose more of the passenger's side than the driver's side of the vehicle 100). As such, the collision results in less risk to the driver of the vehicle 100, who is the only passenger in the vehicle 100.

When the example vehicle response determiner 208 has determined the response to the object, the example instruction generator 210 may generate instructions to be transmitted to systems of the vehicle 100 to initiate the response (e.g., transmitted via the controller 102 of FIG. 1). In some examples, the instruction generator 210 generates instructions to be transmitted (e.g., via the controller 102) to the steering system of the vehicle 100. For example, when the vehicle response determiner 208 determines that the vehicle 100 can avoid a collision by steering the vehicle 100 onto the shoulder of the road, the instruction generator 210 can generate instructions to be provided (e.g., via the controller 102) to the steering system of the vehicle 100 to steer the vehicle 100 toward the shoulder (e.g., steer the vehicle 100 to the right). Further, the example instruction generator 210 may generate instructions transmitted to a braking system of the vehicle 100 (e.g., via the controller 102). For example, when the vehicle response determiner 208 determines that the vehicle 100 is to apply the brakes to avoid a collision with an object, the instruction generator 210 can generate instructions to be provided (e.g., via the controller 102) to the braking system of the vehicle 100 (e.g., an anti-lock braking system (ABS)) to apply a braking force to slow down and/or stop the vehicle 100. In some such examples, the instruction generator 210 may generate instructions for the braking system to apply a hard-braking force to the vehicle 100 (e.g., when the data analyzer 206 determines that the danger level is high, such as a danger level of 10). In some alternative examples, the vehicle response determiner 208 determines that the vehicle 100 is to speed up to avoid a collision. In such an example, the vehicle response determiner 208 can transmit instructions to an engine control module of the vehicle to apply a vehicle throttle to increase the speed of the vehicle 100 and avoid the collision.

While an example manner of implementing the hard-brake avoidance system 104 of FIG. 1 is illustrated in FIG. 2, one or more of the elements, processes and/or devices illustrated in FIG. 2 may be combined, divided, re-arranged, omitted, eliminated and/or implemented in any other way. Further, the example sensor interface 202, the example world generator 204, the example data analyzer 206, the example vehicle response determiner 208, the example instruction generator 210, the example database 212, and/or, more generally, the example hard-brake avoidance system 104 of FIG. 2 may be implemented by hardware, software, firmware and/or any combination of hardware, software and/or firmware. Thus, for example, any of the example sensor interface 202, the example world generator 204, the example data analyzer 206, the example vehicle response determiner 208, the example instruction generator 210, the example database 212, and/or, more generally, the example hard-brake avoidance system 104 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 202, the example world generator 204, the example data analyzer 206, the example vehicle response determiner 208, the example instruction generator 210, the example database 212, and/or, more generally, the example hard-brake avoidance system 104 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example hard-brake avoidance system 104 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
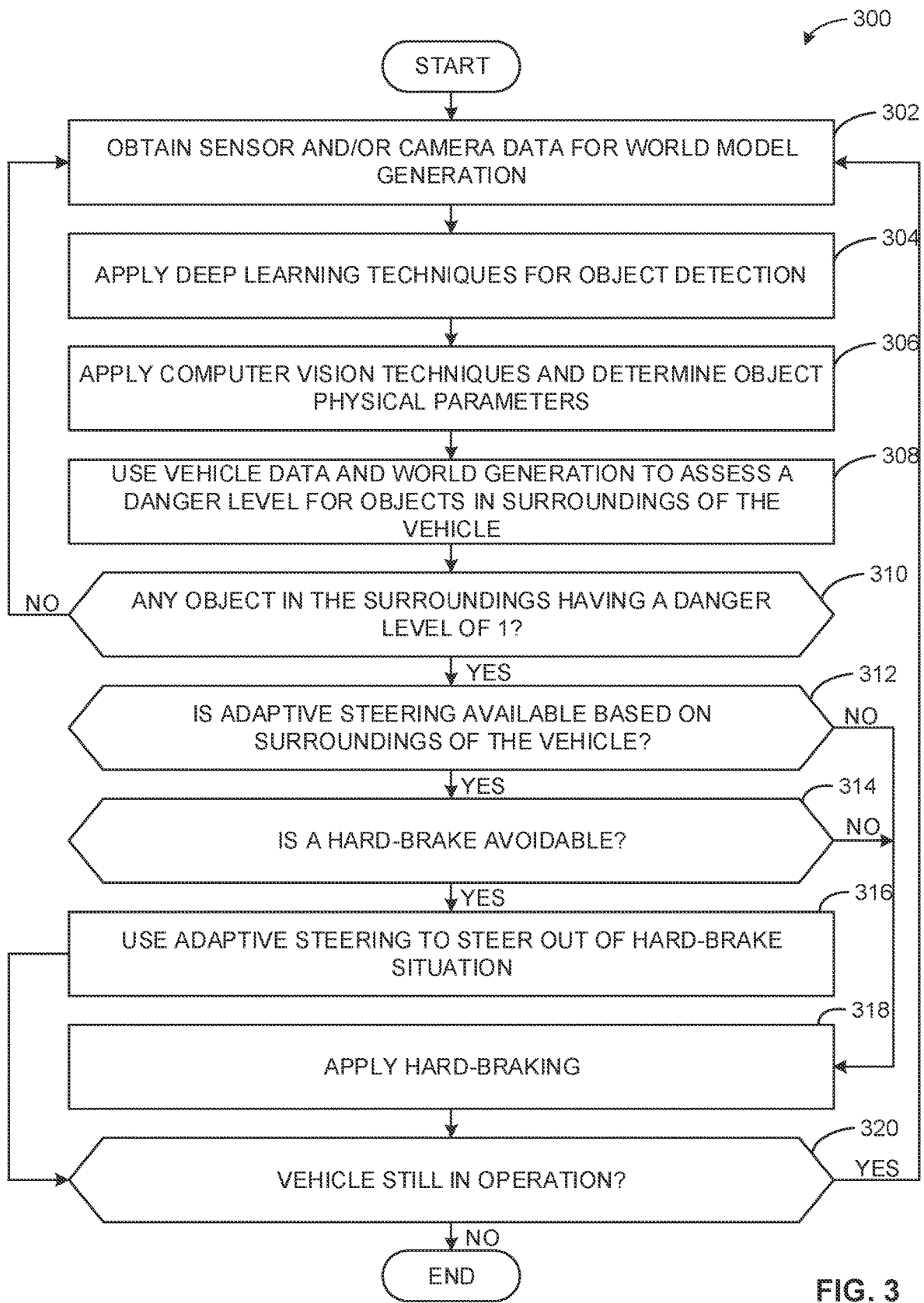
FIG. 3 is a flowchart representative of machine readable instructions which may be executed to implement the example hard-brake avoidance system of FIGS. 1 and/or 2.

A flowchart representative of example hardware logic, machine readable instructions, hardware implemented state machines, and/or any combination thereof for implementing the hard-brake avoidance system 104 of FIGS. 1 and/or 2 is shown in FIG. 3. The machine readable instructions may be an executable program or portion of an executable program for execution by a computer processor such as the processor 412 shown in the example processor platform 400 discussed below in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example hard-brake avoidance system 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 3 is a flowchart representative of machine readable instructions which may be executed to implement the example hard-brake avoidance system 104 of FIGS. 1 and/or 2. The example program 300 of FIG. 3 begins at block 302 where the hard-brake avoidance system 104 obtains sensor and/or camera data for world model generation. For example, the sensor interface 202 of FIG. 2 obtains sensor and/or camera information from the example sensors 106 of FIGS. 1 and/or 2. The sensors 106 may include, for example, a camera, lidar, radar, a supersonic sensor, etc.

At block 304, the hard-brake avoidance system 104 applies deep learning techniques for object detection. For example, the world generator 204 of FIG. 2 may apply deep learning techniques to build a rich (e.g., detailed) model of the surroundings of the example vehicle 100 of FIG. 1. In some examples, the world generator 204 trains a deep learning model to identify and/or categorize objects based on sensor data from the example sensors 106. In some such examples, the deep learning model of the world generator 204 may further identify and/or categorize objects in the surroundings of the vehicle 100 of FIG. 1 and output information regarding the object (e.g., a type of object) to the data analyzer 206 and/or the vehicle response determiner 208 of FIG. 2.

At block 306, the hard-brake avoidance system 104 applies computer vision techniques and determines physical parameters of objects. For example, the world generator 204 may use the sensor data (e.g., obtained at block 302) to calculate a trajectory of moving objects based on Newton's laws. In some such examples, the world generator 204 may calculate a velocity, acceleration, position, and/or other characteristic of an object. In another example, the world generator 204 may use the camera data (e.g., obtained at block 302) to determine a size of the object and/or other characteristics of the object.

The hard-brake avoidance system 104 further uses vehicle data and world generation to assess a danger level for objects in the surroundings of the vehicle 100 (block 308). For example, the data analyzer 206 of FIG. 2 determines, based on the objects in the surrounding area of the vehicle 100 and characteristics of the objects, a danger level associated with one or more objects. In some examples, the data analyzer 206 determines whether the danger level is 0 (e.g., the object does not create a potential harm) or 1 (e.g., indicative of a hard-brake situation). In some alternative examples, the data analyzer 206 determines the danger level as a different value and/or on a different scale, such as a range between 1 and 10 (e.g., where 1 presents little to no danger and 10 presents imminent danger and/or an unavoidable collision).

At block 310, the hard-brake avoidance system 104 determines whether any object in the surroundings has a danger level of 1 (e.g., when the danger level is given a value of 0 or 1). For example, the data analyzer 206 determines whether any danger level associated with an object in the surrounding area of the vehicle 100 has a danger level of 1. When no objects in the surrounding area have a danger level of 1 (e.g., all objects in the surrounding area have danger levels of 0), control of the program 300 returns to block 302.

When one or more objects in the surrounding area have a danger level of 1, control of program 300 proceeds to block 312.

At block 312, the hard-brake avoidance system 104 determines whether adaptive steering is available based on the surroundings of the vehicle 100. For example, the vehicle response determiner 208 of FIG. 2 determines whether the vehicle 100 may use adaptive steering to avoid a collision with the object. In some examples, the vehicle response determiner 208 determines whether other objects (e.g., other vehicles, pedestrians, etc.) prevent the vehicle 100 from steering to avoid the object having a danger level of 1 (e.g., steering the vehicle 100 onto the shoulder, into another lane, etc.). When the vehicle response determiner 208 determines that adaptive steering is available (e.g., a lane or shoulder is clear of objects and/or obstacles), control of the program 300 proceeds to block 314. On the other hand, when the vehicle response determiner 208 determines that adaptive steering is not available (e.g., a lane or shoulder is obstructed by objects and/or obstacles), control of the program 300 proceeds to block 318.

The hard-brake avoidance system 104 further determines whether a hard-brake is avoidable (block 314). For example, the vehicle response determiner 208 may determine whether an obstacle is too close to the vehicle 100 to be avoided (e.g., another vehicle cuts in front of the vehicle 100). In some examples, the collision cannot be avoided without applying a hard-brake. In such examples, the hard-brake is to be applied to avoid the collision. When the vehicle response determiner 208 determines that the hard-brake is avoidable (e.g., the vehicle 100 can avoid the object using adaptive steering), control of the program 300 proceeds to block 316. When the vehicle response determiner 208 determines that the hard-brake is not avoidable (e.g., an object is too close to the vehicle 100), control of the program 300 proceeds to block 318.

At block 316, the hard-brake avoidance system 104 uses adaptive steering to steer out of a hard-brake situation. For example, the instruction generator 210 may generate instructions to be transmitted (e.g., via the controller 102 of FIG. 1) to a steering system of the vehicle 100 to steer the vehicle 100 according to the response determined by the vehicle response determiner 208 (e.g., steer the vehicle 100 onto the shoulder).

At block 318, the vehicle response determiner 208 applies hard-braking. For example, when the vehicle response determiner 208 determines that the vehicle 100 is to apply a hard-brake to avoid a collision, the instruction generator 210 generates instructions to be transmitted (e.g., via the controller 102) to a braking system of the vehicle 100 to apply a hard-brake to stop the vehicle 100. In some examples, the vehicle response determine 208 determines that the vehicle 100 is to execute blocks 316 and 318 simultaneously (e.g., the vehicle 100 is to hard-brake and initiate an adaptive steering maneuver simultaneously).

The hard-brake avoidance system 104 further determines whether the vehicle 100 is still in operation (block 320). When the vehicle 100 is still in operation, control of the program 300 returns to block 302. When the vehicle 100 is determined to no longer be in operation, the program 300 concludes.

Figure 4:
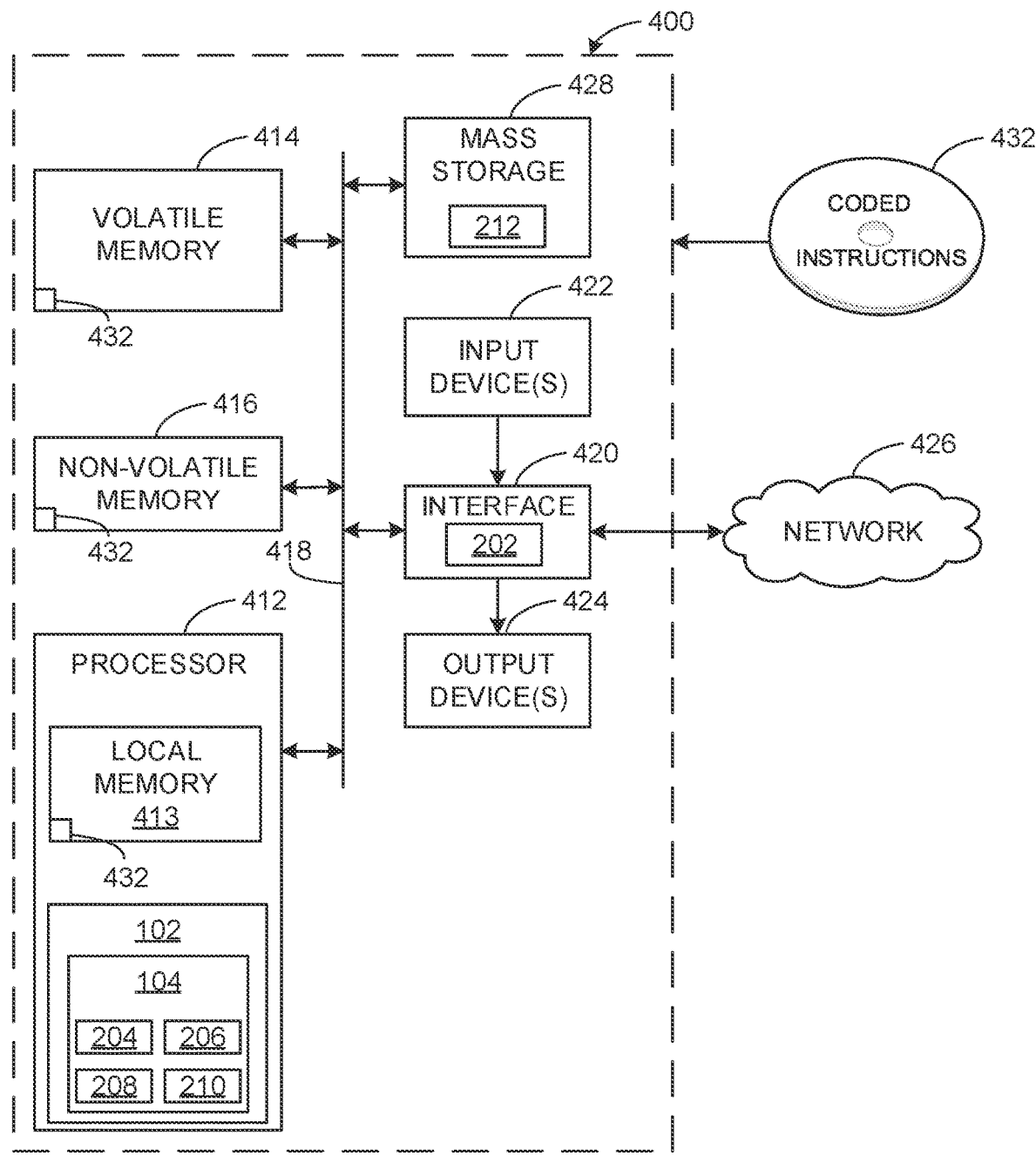
FIG. 4 is a block diagram of an example processing platform structured to execute the instructions of FIG. 3 to implement the example hard-brake avoidance system of FIGS. 1 and/or 2.

FIG. 4 is a block diagram of an example processor platform 400 structured to execute the instructions of FIG. 3 to implement the hard-brake avoidance system 104 of FIGS. 1 and/or 2. The processor platform 400 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a headset or other wearable device, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example controller 102, the example world generator 204, the example data analyzer 206, the example vehicle response determiner 208, the example instruction generator 210, and/or, more generally, the example hard-brake avoidance system 104 of FIG. 2.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface. In the illustrated example of FIG. 4, the interface circuit 420 includes the example sensor interface 202 of FIG. 2.

In the illustrated example, one or more input devices 422 are connected to the interface circuit 420. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 420 of the illustrated example, thus, typically includes a graphics driver card, a graphics driver chip and/or a graphics driver processor.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives. In the illustrated example of FIG. 4, the mass storage devices 428 include the example database 212 of FIG. 2.

The machine executable instructions 432 of FIG. 3 may be stored in the mass storage device 428, in the volatile memory 414, in the non-volatile memory 416, and/or on a removable non-transitory computer readable storage medium such as a CD or DVD.

From the foregoing, it will be appreciated that example methods, apparatus and articles of manufacture have been disclosed that mitigate hard-braking events. The examples disclosed herein analyze objects within the surroundings of a vehicle, determine a danger level associated with the objects and, further, determine how to avoid and/or mitigate hard-braking by using adaptive steering while maintaining driver and/or passenger comfortability. The examples disclosed herein further provide instructions to a steering system and/or a braking system of the vehicle to steer away from a collision and/or brake to avoid the collision. Some examples disclosed herein calculate an amount of damage that is to be incurred by different vehicle responses (e.g., steering maneuvers, braking, etc.), and determine the response that will result in the least damage to the vehicle and/or injury to the driver and/or passengers.

Example methods, apparatus, systems, and articles of manufacture that mitigate hard-braking events are disclosed herein. Further examples and combinations thereof include the following: example 1 includes an apparatus comprising a world generator to generate a deep learning model to identify and categorize an object in a proximity of a vehicle, a data analyzer to determine a danger level associated with the object, the danger level indicative of a likelihood of a collision between the vehicle and the object, a vehicle response determiner to determine, based on the danger level, a response of the vehicle to avoid a collision with the object, and an instruction generator to generate instructions transmitted to a steering system or a braking system of the vehicle based on the determined vehicle response.

Example 2 includes the apparatus of example 1, wherein the world generator is further to categorize the object as movable or stationary based on vehicle sensor information.

Example 3 includes the apparatus of example 2, wherein the vehicle sensor information includes information from at least one of a camera, radar, lidar, supersonic sensors, or point-to-point communications.

Example 4 includes the apparatus of example 1, wherein the world generator is further to determine object characteristics including at least one of velocity, acceleration, or position of the object based on vehicle sensor information.

Example 5 includes the apparatus of example 1, wherein the vehicle response determiner is to, when the danger level meets a threshold and an adaptive steering maneuver is available, determine that the vehicle is to initiate the adaptive steering maneuver in response to the object.

Example 6 includes the apparatus of example 5, wherein the vehicle response determiner is further to determine a position of a passenger in the vehicle and determine the adaptive steering maneuver based on the position of the passenger.

Example 7 includes the apparatus of example 1, wherein the vehicle response determiner is to, when the danger level meets a threshold and an adaptive steering maneuver is unavailable, determine that the vehicle is to initiate a hard-brake in response to the object.

Example 8 includes the apparatus of example 1, wherein the vehicle response determiner is to, when the danger level is below a threshold, determine that the vehicle is not to take action in response to the object.

Example 9 includes the apparatus of example 1, wherein the world generator is further to determine a subsequent movement of the object based on the deep learning model.

Example 10 includes a non-transitory computer readable storage medium comprising instructions that, when executed, cause a machine to at least generate a deep learning model to identify and categorize an object in a proximity of a vehicle, determine a danger level associated with the object, the danger level indicative of a likelihood of a collision between the vehicle and the object, determine, based on the danger level, a response of the vehicle to avoid a collision with the object, and generate instructions transmitted to a steering system or a braking system of the vehicle based on the determined vehicle response.

Example 11 includes the non-transitory computer readable storage medium of example 10, wherein the instructions, when executed, further cause the machine to categorize the object as movable or stationary based on vehicle sensor information.

Example 12 includes the non-transitory computer readable storage medium of example 11, wherein the vehicle sensor information includes information from at least one of a camera, radar, lidar, supersonic sensors, or point-to-point communications.

Example 13 includes the non-transitory computer readable storage medium of example 10, wherein the instructions, when executed, further cause the machine to determine object characteristics including at least one of velocity, acceleration, or position of the object based on vehicle sensor information.

Example 14 includes the non-transitory computer readable storage medium of example 10, wherein the instructions, when executed, further cause the machine to determine that the vehicle is to, when the danger level meets a threshold and an adaptive steering maneuver is available, initiate the adaptive steering maneuver in response to the object.

Example 15 includes the non-transitory computer readable storage medium of example 14, wherein the instructions, when executed, further cause the machine to determine a position of a passenger in the vehicle and determine the adaptive steering maneuver based on the position of the passenger.

Example 16 includes the non-transitory computer readable storage medium of example 10, wherein the instructions, when executed, further cause the machine to determine that the vehicle is to, when the danger level meets a threshold and an adaptive steering maneuver is unavailable, initiate a hard-brake in response to the object.

Example 17 includes the non-transitory computer readable storage medium of example 10, wherein the instructions, when executed, further cause the machine to determine a subsequent movement of the object based on the deep learning model.

Example 18 includes a method comprising generating a deep learning model to identify and categorize an object in a proximity of a vehicle, determining a danger level associated with the object, the danger level indicative of a likelihood of a collision between the vehicle and the object, determining, based on the danger level, a response of the vehicle to avoid a collision with the object, and generating instructions transmitted to a steering system or a braking system of the vehicle based on the determined vehicle response.

Example 19 includes the method of example 18, further including determining object characteristics including at least one of velocity, acceleration, or position of the object based on vehicle sensor information.

Example 20 includes the method of example 18, further including determining that the vehicle is to, when the danger level meets a threshold and an adaptive steering maneuver is available, initiate the adaptive steering maneuver in response to the object.

Example 21 includes the method of example 20, further including determining a position of a passenger in the vehicle and determining the adaptive steering maneuver based on the position of the passenger.

Example 22 includes the method of example 18, further including determining that the vehicle is to, when the danger level meets a threshold and an adaptive steering maneuver is unavailable, initiate a hard-brake in response to the object.

Example 23 includes the method of example 18, further including determining a subsequent movement of the object based on the deep learning model.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A first vehicle comprising:
    wireless communication circuitry to communicate with a second vehicle;
    processor circuitry to:
        identify a hazard based on:
            wireless communications with another entity; and
            at least one sensor of the first vehicle;
        determine whether a trajectory avoids both the hazard and a hard brake event, the determination based on:
            a likelihood of collision between the first vehicle and the hazard;
            a level of an injury expected from the collision; and
            an ability of a driver of the first vehicle to avoid the injury; and
        in response to a determination that the trajectory avoids both the hazard and the hard brake event, cause a change in a speed of the first vehicle or a change in direction of the first vehicle to implement the trajectory.

2. The first vehicle of claim 1, wherein the processor circuitry is to cause transmission of instructions to a vehicle control unit to reduce the speed and change the direction of the first vehicle.

3. The first vehicle of claim 1, wherein the processor circuitry is to change a direction of the first vehicle by causing a lane change.

4. The first vehicle of claim 1, wherein the at least one sensor includes one or more of: a camera sensor, a radar sensor, or a lidar sensor.

5. The first vehicle of claim 1, wherein the hazard is a third vehicle.

6. The first vehicle of claim 1, wherein the wireless communication circuitry is to communicate with the first vehicle via point to point communications.

7. The first vehicle of claim 1, wherein the processor circuitry is to, in response to the determination, cause a change in a speed of the first vehicle and a change in direction of the first vehicle to avoid a hard brake event.

8. The first vehicle of claim 1, wherein to determine the trajectory avoids both the hazard and the hard brake event, the processor circuitry is to predict a first braking force required to implement one of a plurality of possible trajectories.

9. A non-transitory computer readable medium comprising instructions that, when executed, cause a vehicle to at least:
    identify a hazard based on:
        wireless communications with another entity; and
        at least one sensor of the vehicle;
    determine whether a trajectory avoids both the hazard and a hard brake event, the determination based on:
        a likelihood of collision between the vehicle and the hazard;
        a level of an injury expected from the collision; and
        an ability of a driver of the vehicle to avoid the injury; and
    in response to a determination that the trajectory avoids both the hazard and the hard brake event, cause a change in a speed of the vehicle or a change in direction of the vehicle to implement the trajectory.

10. The non-transitory computer readable medium of claim 9, wherein the instructions, when executed, cause the vehicle to cause transmission of instructions to a vehicle control unit to reduce the speed and change the direction of the vehicle.

11. The non-transitory computer readable medium of claim 9, wherein the instructions, when executed, cause the vehicle to change a direction of the vehicle by causing a lane change.

12. The non-transitory computer readable medium of claim 9, wherein the at least one sensor includes one or more of: a camera sensor, a radar sensor, or a lidar sensor.

13. The non-transitory computer readable medium of claim 9, wherein the vehicle is a first vehicle, and the hazard is a second vehicle.

14. The non-transitory computer readable medium of claim 9, wherein to determine the trajectory avoids both the hazard and the hard brake event, the instructions, when executed, cause the vehicle to predict a first braking force required to implement one of a plurality of possible trajectories.

15. A vehicle comprising:
    at least one sensor;
    at least one vehicle brake;
    a motor;
    wireless communication circuitry to communicate with another vehicle;
    controller circuitry to:
        identify a hazard based on:
            wireless communications with another entity; and
            the at least one sensor;
        determine whether a trajectory avoids both the hazard and a hard brake event, the determination based on:
            a likelihood of collision between the vehicle and the hazard;
            a level of an injury expected from the collision; and
            an ability of a driver of the vehicle to avoid the injury; and
        in response to a determination that the trajectory avoids both the hazard and the hard brake event, cause a change in a speed of the vehicle or a change in direction of the vehicle to implement the trajectory.

16. The vehicle of claim 15, wherein the controller circuitry is to cause transmission of instructions to a vehicle control unit to reduce the speed and change the direction of the vehicle.

17. The vehicle of claim 15, wherein the controller circuitry is to change a direction of the vehicle by causing a lane change.

18. The vehicle of claim 15, wherein the at least one sensor includes one or more of: a camera sensor, a radar sensor, or a lidar sensor.

19. The vehicle of claim 15, wherein the vehicle is a first vehicle, and the hazard is a second vehicle.

20. The vehicle of claim 15, wherein to determine the trajectory avoids both the hazard and the hard brake event, the controller circuitry is to predict a first braking force required to implement one of a plurality of possible trajectories.

* * * * *